United States Patent [19]

Bulluck, Jr.

[11] Patent Number: 5,018,281
[45] Date of Patent: May 28, 1991

[54] TOBACCO BARN WITH HEAT EXCHANGER SYSTEM

[76] Inventor: S. Thomas Bulluck, Jr., Rt. 1, Box 106, Pinetops, N.C. 27864

[21] Appl. No.: 613,995

[22] Filed: Nov. 15, 1990

[51] Int. Cl.$^5$ ............................................. F26B 19/00
[52] U.S. Cl. ........................................... 34/35; 34/86; 165/166; 165/909
[58] Field of Search ...................... 34/86, 35; 165/909

[56] References Cited

U.S. PATENT DOCUMENTS 1,430,596 10/1922 Scott ......................................... 34/86
1,530,065 3/1925 Walsh ....................................... 34/86
4,171,722 10/1979 Huggins ............................... 165/909

*Primary Examiner*—Albert W. Davis, Jr.
*Attorney, Agent, or Firm*—Rhodes, Coats & Bennett

[57] ABSTRACT

The present invention entails a heat exchanger system for a tobacco curing and drying structure that is designed to utilize the heat associated with exhaust air leaving the structure to heat fresh incoming air being directed into the structure. In particularly, the present invention entails a top mounted heated exchanger system including a pair of laterally spaced counterflow heat exchange modules connected to the barn and to a fresh air transfer duct that leads back into the curing and drying structure. Heated exhaust air is routed through the exchange modules before being exhausted to the atmosphere. Counterflowing, but separated, fresh air traveling through the same heat exchange modules is heated by the exhaust air before being introduced into the curing and drying structure.

10 Claims, 6 Drawing Sheets

TOBACCO BARN WITH HEAT EXCHANGER SYSTEM

FIELD OF THE INVENTION

The present invention relates to tobacco curing and drying and more particularly to curing and drying structures having a heat exchange system associated therewith.

BACKGROUND OF THE INVENTION

Today, a majority of the flue cured tobacco crop is cured in a curing and drying structure that is typically referred to as a bulk barn. A bulk barn includes a curing and drying chamber or section and a furnace area that includes a fan. The fan functions to circulate air into the curing and drying chamber and vertically through the tobacco afterwhich the air is either exhausted or recirculated to the furnace area where it may be heated or not heated, depending on the temperature within the barn and the particular curing and drying phase. During certain periods of the curing and drying schedule, substantial quantities of moisture must be removed from the leaf. Thus, during the process, the heated air being circulated within the curing and drying structure becomes saturated or nearly saturated with moisture and accordingly to continue to be effective in the drying process, a certain portion of this moist air must be dumped or exhausted from the curing and drying structure. There is an abundance of energy in the form of heat associated with this warm moist air that is being exhausted from a tobacco barn, especially during the leaf drying period. This means that this energy is lost. With the cost of fuel continuing to rise and the cost of bulk tobacco barns continuing to increase, it is very important and beneficial to save as much fuel as possible in curing and drying tobacco and also to be able to cure and dry a certain size crop with a minimum number of barns.

There have been attempts at incorporating heat exchangers into tobacco curing and drying structures. It has been recognized that the heat associated with the exhaust air from a curing a drying structure can be used to heat incoming fresh air. For example, there have been very simplistic approaches to this problem. Once such approach has been simply to dispose two ducts in side-by-side relationship about the end of a tobacco barn and to exhaust air through one such duct and route incoming fresh air through the other duct. In such a case, heat associated with the exhaust air to some extent at least, can be transferred to the incoming fresh air passing in the adjacent duct. Obviously, this is a very crude and inefficient system that has no flexibility whatsoever.

In addition to the simplistic, there have been very complicated approaches to providing heat exchangers for tobacco curing and drying structures. In this regard, one is referred to U.S. Pat. No. 4,499,911 which discloses a solar tobacco barn having computer operated heat exchange system for a plurality of barns. The complexities and expense of this system are obvious from a review of the '911 patent. Again, the system disclosed in this patent is quite expensive and costly to maintain, but most importantly, the system is of the type designed to accommodate a series of six barns. Therefore, the system disclosed in the Johnson U.S. Pat. No. 4,499,911, does not really address the real need of providing an effective, efficient, and reasonably priced heat exchanger for a single bulk curing barn.

Beyond that, there are literally tens of thousands of barns existing on tobacco farms today that are owned by farmers struggling to make efficient use of their energy dollar. There are no heat exchanger kits or units commercially available that enable such a heat exchange system to be retrofited to a tobacco barn.

SUMMARY AND OBJECTS OF THE INVENTION

The present invention presents an efficient heat exchanger system for a tobacco curing and drying structure that can be either incorporated during the manufacture of a new bulk barn or can be retrofited to existing tobacco barns. The heat exchanger system of the present invention entails a pair of laterally spaced counterflow heat transfer modules that are mounted atop a conventional tobacco curing and drying barn. Each module includes a plurality of spaced apart conduits or channels that are designed to accommodate counter flowing fresh incoming air and heated exhaust air. The fresh incoming air that is heated by the exhaust air is directed and transferred into a main transfer or delivery duct that extends between the two exchange modules. This main fresh air transfer duct is communicatively connected to the curing and drying structure and functions to direct heated incoming fresh air into the curing and drying structure where that heated fresh air is circulated throughout the barn.

It is therefore an object of the present invention to provide an effective and efficient heat exchanger system for a tobacco curing and drying structure.

Another object of the present invention entails the provision of a heat exchanger system for a tobacco curing and drying structure that is particularly suited for use by a single bulk tobacco barn or curing a drying structure.

Another object of the present invention resides in the provision of a heat exchanger system that is capable of being easily retrofitted to an existing curing and drying structure.

Still a further object of the present invention resides in the provision of a heat exchanger system that is capable of being retrofitted to most, if not all, bulk tobacco barns.

Another object of the present invention resides in the provision of a heat exchanger system for a tobacco curing and drying structure that is capable of substantial savings in fuel cost and in curing time.

Another object of the present invention resides in the provision of a heat exchanger system that allows for relatively high flow rates of incoming fresh air that permits total curing and drying time to be reduced.

It is also an object of the present invention to provide a heat exchanger system that is easily adaptable for use with a series of barns for the purpose of transferring energy or heat from one barn or another during various curing and drying schedules.

A further object of the present invention resides in the provision of a heat exchanger system where a conventional bulk tobacco curing and drying structure that does not change the basic operating characteristic of the curing and drying structure.

Still a further object of the present invention resides in the provision of a heat exchanger for a bulk tobacco curing and drying structure that can be moved from one curing structure to another.

DESCRIPTION OF THE INVENTION

Figure 1:
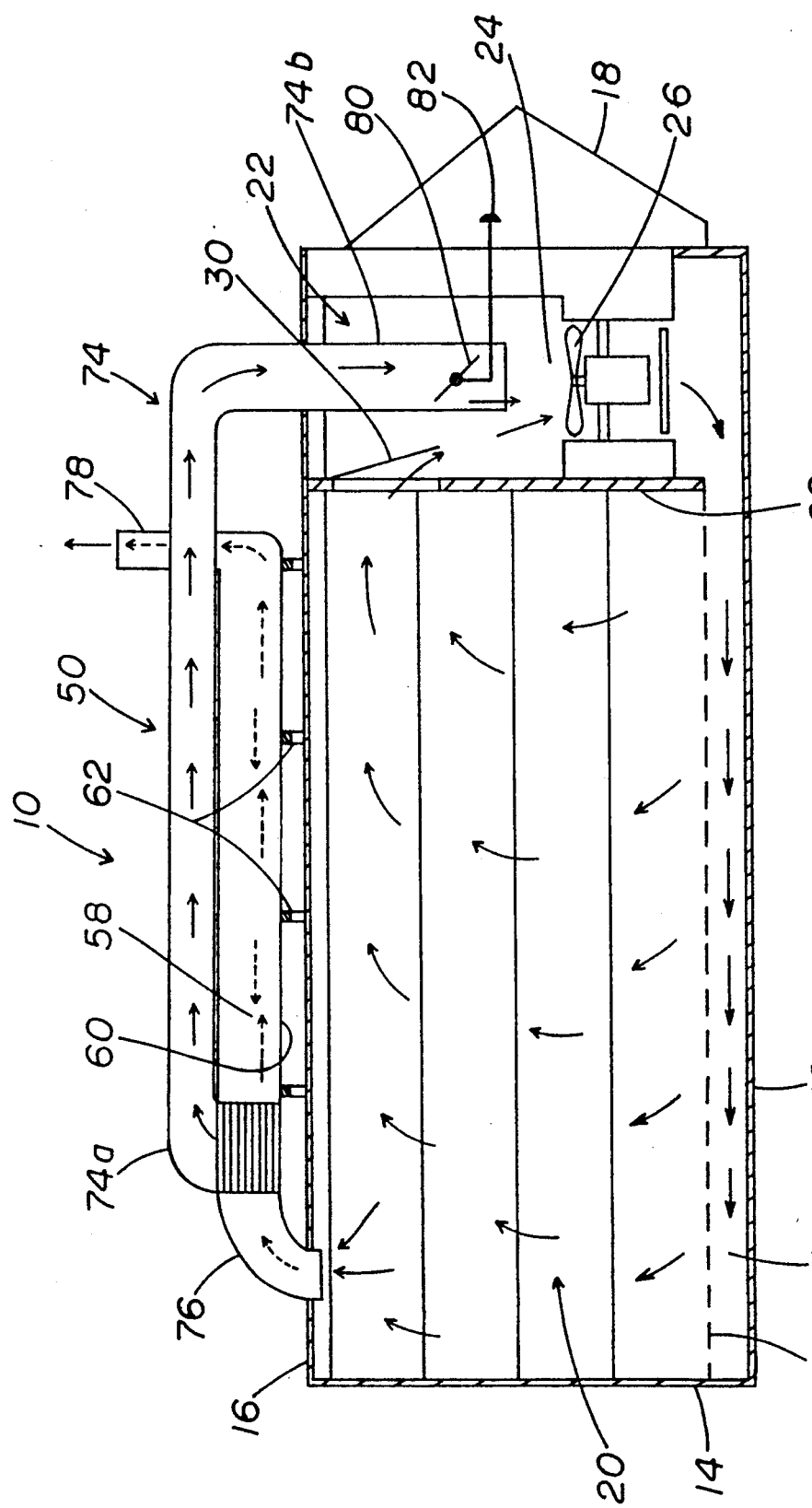
FIG. 1 is a side elevational view of a bulk tobacco barn having the present heat exchanger system incorporated therein with a side portion of the barn being removed to better illustrate the internal structure of the bulk barn and the relationship of the heat exchanger system with the bulk barn.
Figure 2:
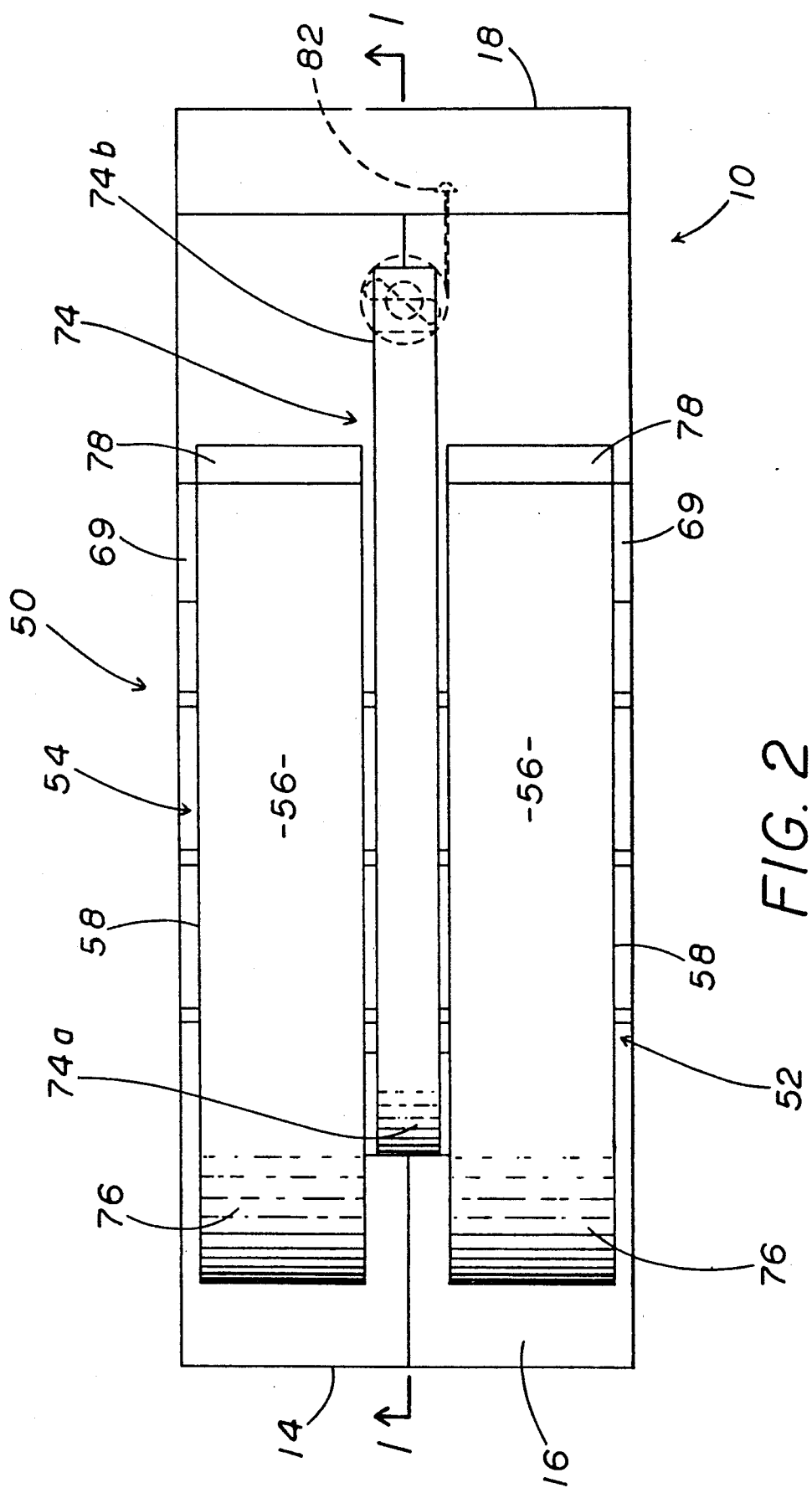
FIG. 2 is a top plan view of the bulk tobacco barn and heat exchanger system of the present invention.
Figure 3:
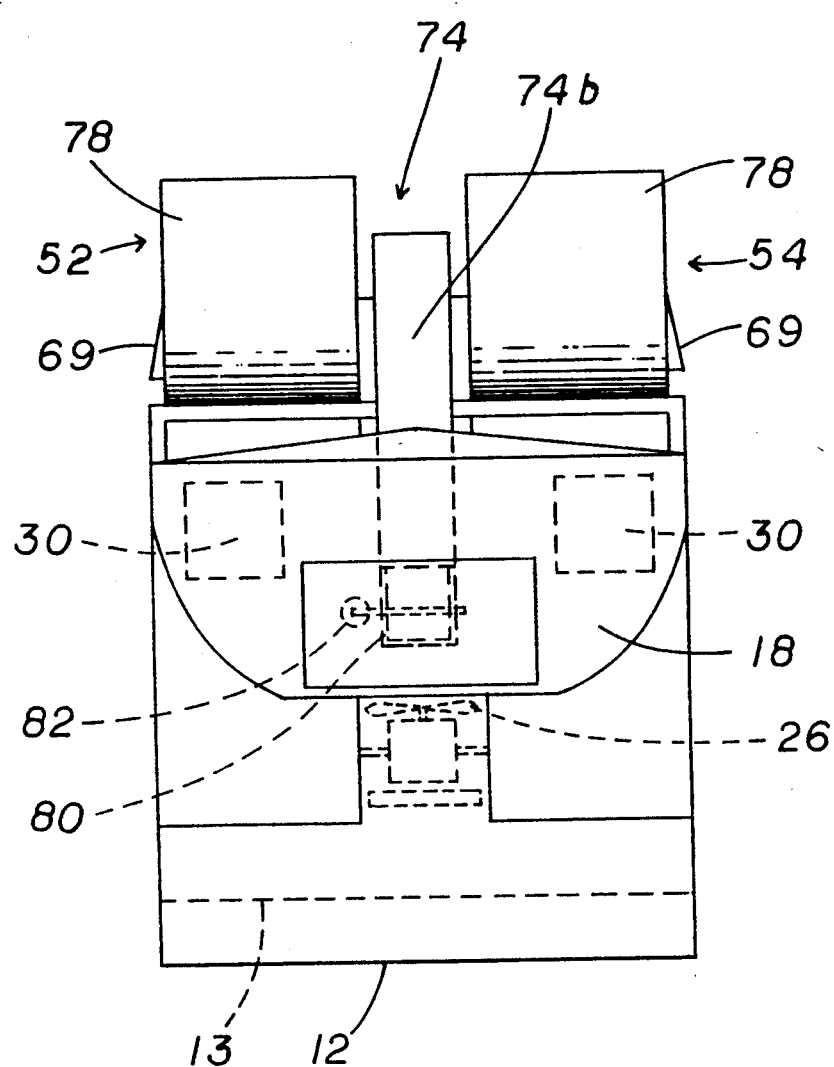
FIG. 3 is a rear elevational view of a bulk tobacco curing and drying structure with the heat exchanger of the present invention incorporated therein.
Figure 4:
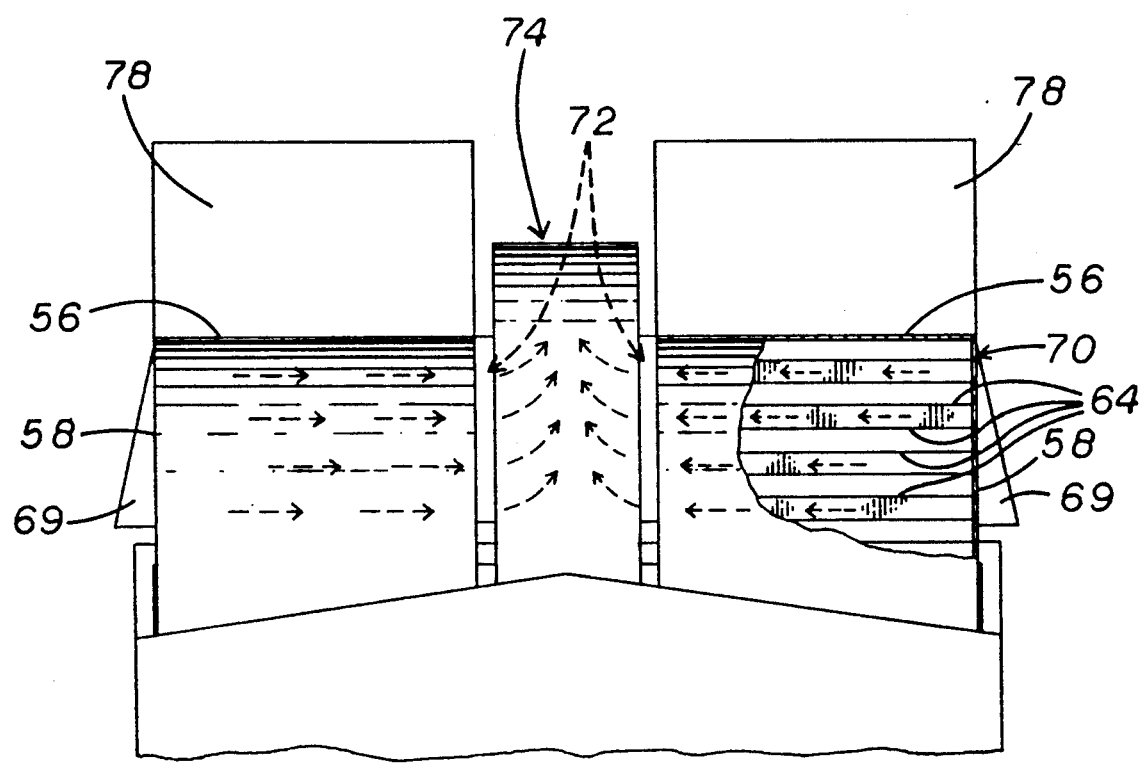
FIG. 4 is a fragmentary front elevational view of the heat exchanger system with portions of the duct work being broken away to illustrate the exhaust air inlet to the heat exchanger system.
Figure 5:
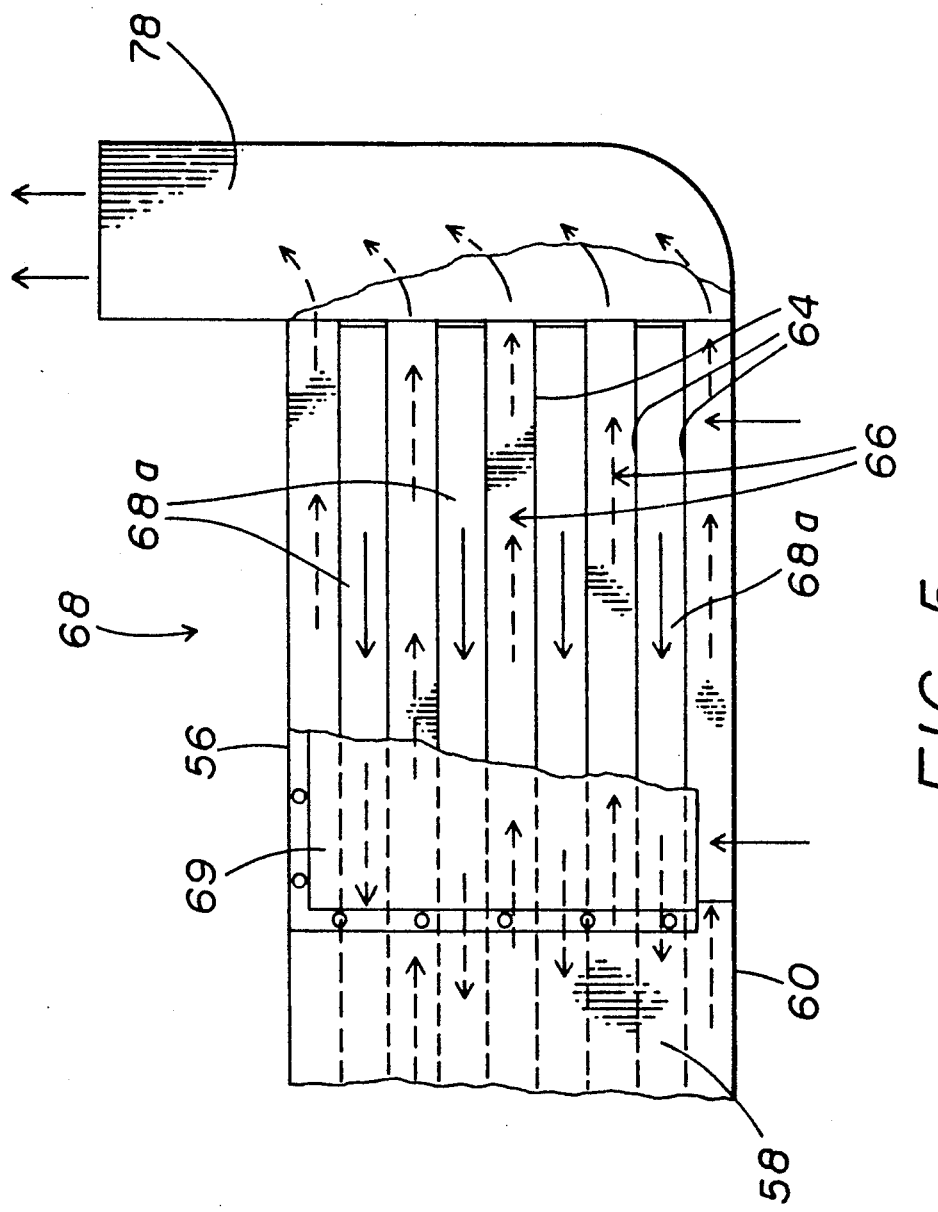
FIG. 5 is a fragmentary side elevational view of a portion of one heat exchange module illustrating the side fresh air inlet formed therein.
Figure 6:
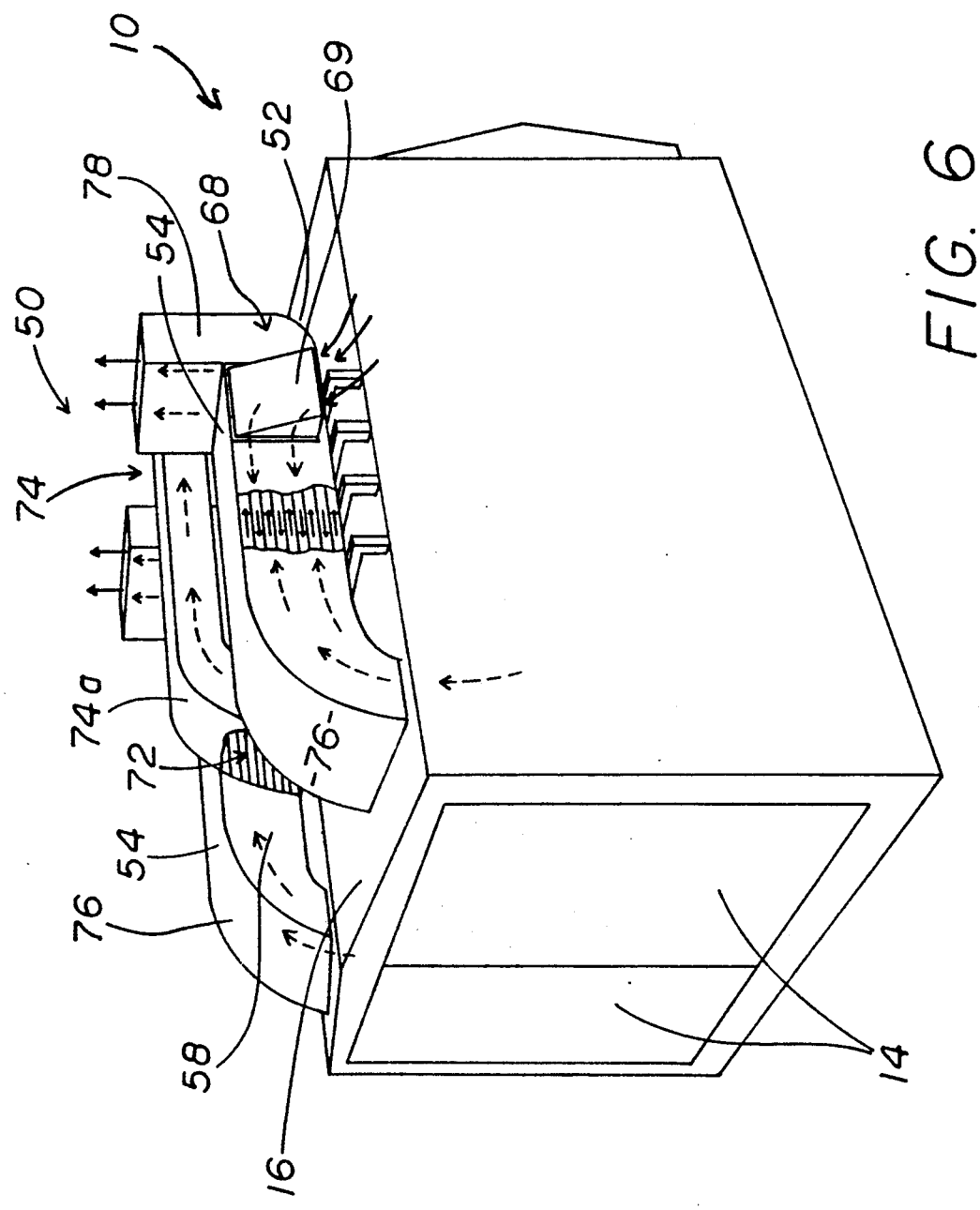
FIG. 6 is a perspective view of a bulk tobacco barn having the heat exchanger system of the present invention incorporated therein and which basically shows the various air flows traveling through the heat exchanger system and the bulk tobacco barn.

With further reference to the drawings, the curing and drying structure of the present invention is shown therein and indicated generally by the numeral 10. Drying structure 10 is a conventional bulk tobacco barn. Such bulk tobacco barns are conventional and are presently commercially available. Therefore, a detailed description of such is not required and is not per say material to the present invention. For a complete and unified understanding of bulk tobacco barns, one is referred to the disclosures found in U.S. Pat. Nos. 3,105,713; 3,503,137; 3,937,227 and 3,664,034, these disclosures being expressly incorporated herein by reference.

Briefly describing the curing and drying structure or bulk tobacco barn 10 shown in the drawings, the same includes a foundation slab 12 that supports a perforated floor 13 and wherein there is defined an air flow plenum 15 between the perforated floor 13 and slab 12. Formed about the front of the curing and drying structure 10 is one or more front doors 14. The curing and drying structure further includes a top 16 and a back 18. Formed internally within the curing and drying structure 10 is a front curing and drying chamber 20 that is adapted to receive and hold tobacco therein for curing and drying. Disposed rearwardly of the curing and drying chamber is a furnace room or area 22 that is separated from the curing and drying chamber 20 by a separating wall 28. Conventionally provided within the furnace room 22 is a furnace system 24 having a circulating fan 26. Formed in the separating wall 28 is a pair of recirculating static dampers 30 that function to control the volume and flow of air that is recirculated from the curing and drying chamber 20 to the furnace room 22 during the curing and drying process.

It is appreciated that during the curing and drying process that fresh outside air is brought into the structure and circulated through the tobacco supported within the structure. To make room for the fresh incoming air, it follows that some existing air within the barn must be exhausted. This is especially true during drying portions of the curing and drying schedule because it is during this portion of the curing and drying schedule where substantial quantities of moisture are removed from the tobacco. To provide for an efficient drying process, it follows that one must continue to exhaust this moisture laden air so as to enable fresh air to be induced into the barn. In exhausting this moisture laden air, substantial energy is lost because such exhaust air has been heated and is relatively warm while the incoming fresh air is relatively cool and must be heated so as to maintain the temperature within the barn at a given scheduled drying temperature.

In order to recapture heat associated with air that is being exhausted from the curing and drying structure 10, the present invention provides a heat exchanger system, indicated generally by the numeral 50, that is mounted on the top 16 of curing and drying structure 10. As will become apparent from subsequent portions of this disclosure, the heat exchanger system 50 functions to transfer heat associated with air being exhausted from the curing and drying structure to fresh incoming air so as to effectively heat the same prior to the fresh incoming air entering the curing and drying structure.

The heat exchanger system 50 comprises a pair of side-by-side counter flow heat exchanger modules 52 and 54. Each heat exchange module is of a rectangular elongated duct type design and includes a top 56, pair of sides 58 and a bottom 60. As seen in the drawings, each exchanger module 52 and 54 is supported on top of the curing and drying structure 10 by a support structure.

Viewing each exchanger module 52 and 54, it is seen that each comprises a series of spaced apart elongated panels 64 with the respective panels defining a series of spaced apart channels 66. As will be appreciated from subsequent portions of this disclosure, some of the channels 66 will be designated exhaust air channels while some will be designated as fresh or draft air channels. The exhaust air and fresh air channels are alternately spaced such that there will be streams of exhaust and fresh air flowing adjacent to each other but in counter directions.

About a rear or first end portion of each exchanger module 52,54 is a fresh air inlet section indicated generally by the numeral 68. It is appreciated that the fresh air inlet section 68 is formed on the outside of each exchanger module 52,54. Essentially, fresh air inlet section 68 is open to fresh air inlet channels, referred to by 68a, formed within respective heat exchanger module 52 or 54. Consequently, every other channel 66 extending across the fresh air inlet section 68 is a fresh air inlet 68a and is open to receive induced or draft fresh air. Secured to each heat exchange module 52 and 54 adjacent the fresh air inlet section 68 is a weather shield or shroud 69. Note that the weather shield or shroud 69 extends downwardly over the fresh air inlet section and tends to prevent rain from being induced into the heat exchange modules 52 and 54.

Formed about the opposite end of each heat exchanger module 52,54 is an exhaust air inlet section indicated generally by the numeral 70. It is appreciated from the drawings that exhaust air inlet section 70 extends transversely across the end of each heat exchanger module 52 or 54 and thus is disposed at a right angle with respect to the side disposed fresh air inlet section 68. In any event, exhaust air inlet section 70 is open to alternatively designated exhaust air channels 66 and is closed to channels designated as fresh air chambers.

Formed about the inner side of each heat exchanger module 52 and 54 about the front end or end adjacent the exhaust air inlet sections 70, is a fresh air outlet section indicated generally by the numeral 72. Fresh air outlet section 72 provides an outlet in the appropriate designated fresh air channels 66 that permits the fresh air traveling towards the front of the curing and drying structure 10 to exit the heat exchanger modules 52 and 54. Communicatively connected to both fresh air outlet sections 72 of the respective heat exchanger module 52 and 54 is a main fresh air transfer duct indicated generally by the numeral 74 which extends from a front portion of the curing and drying structure to the furnace area 22. Main fresh air transfer duct 74 includes an inlet end portion 74a that effectively connects to the fresh air outlet sections 72 of the respective heat exchange modules 52 and 54. In addition, main fresh air transfer duct 74 includes an outlet end portion 74b that turns downwardly and extends through an upper opening in the furnace room 22 and terminates just above furnace system 24 and fan 26.

In order to transfer exhaust air from the curing and drying chamber 20 to the respective heat exchanger modules 52 and 54, there is provided a pair of exhaust air transfer ducts 76. Note in the drawings that each exhaust air transfer duct 76 is communicatively connected with the curing and drying chamber 20 through an opening formed in the top 16 of the curing and drying structure 10. In addition, each exhaust air transfer duct is coupled directly to the end of the exhaust air inlet section 70 of each heat exchanger module 52,54.

Secured to the opposite ends of each heat exchanger module 52 and 54 is an exhaust air discharged stack 78. It is appreciated that the discharge stack 78 is communicatively connected to the respective exhaust air channel 66 formed in the heat exchanger module thus resulting in the exhaust air being directed into the discharge stack 78 which results in the exhaust air being directed into the atmosphere.

Fresh or draft air is induced into the fresh air inlet sections 68 and after entering the fresh air inlet sections, the air is turned approximately 90° C. and travels down the heat exchanger modules 52 and 54 towards the front of the curing and drying structure. It is thus appreciated that the fresh or draft air is moving within the heat exchanger modules 52 and 54 counter to the flow of the heated exhaust air. Because the fresh air and the heated exhaust air travel in alternately spaced channels 66, it is appreciated that efficient heat transfer occurs as the energy in the form of heat associated with the exhaust air is transferred through the elongated panels 64 to the fresh incoming air traveling in the dedicated fresh air channels. Once the fresh air reaches the forward portion of the respective heat exchanger modules 52 and 54, the fresh air is exhausted out the fresh air outlet section 72 into the main fresh air transverse duct 74 where the now heated fresh air is transferred into the furnace room 22 where fan 26 is operative to recirculate that air through the curing and drying structure.

In order to control the flow of exhaust air and fresh air through the heat exchanger system of the present invention, there is provided a control damper 80 that is disposed in the terminal portion of the main fresh air transfer duct 74. An actuator assembly 82 is connected to the control damper 80 and extends from the rear of the curing and drying structure for convient access, allowing the farmer to manually control the flow of exhaust and fresh air through the heat exchanger system by simply adjusting the position of damper 80. Consequently, it is appreciated that the farmer can, from time to time, vary and control the flow of fresh air being induced into the barn The advantages of the heat exchanger system 50 of the present invention are many. First and foremost, it extracts energy from heated exhaust air that is being wasted to the atmosphere and transfers that energy in the form of heat to the incoming fresh air. This obviously means that the fresh incoming air is preheated prior to the time it is directed into the curing and drying structure and consequently less fuel is required to cure and dry a certain quantity of tobacco. Beyond that, greater drying efficiency is achieved by being able to increase the volume of fresh incoming air thereby expediting the drying process which consequently has the effect of shortening the drying period. This will enable a farmer to cure and dry a greater quantity of tobacco crop for a given number of tobacco barns.

The present heat exchanger system for a tobacco curing and drying structure is very efficient and effective in conserving energy and expediting the curing and drying schedule. The design of a heat exchanger system is not complex and can be properly operated by farmers themselves.

The present invention may, of course, be carried out in other specific ways than those herein set forth without departing from the spirit and essential characteristics of the invention. The present embodiments are, therefore, to be considered in all respects as illustrative and not restrictive and all changes coming within the meaning and equivalency range of the appended claims are intended to be embraced therein.

What is claimed is:

1. A tobacco curing and drying system that utilizes air to an air heat exchanger comprising: a tobacco curing and drying structure having a top, a curing a drying chamber, and a furnace area for housing a furnace system having a fan for circulating air through the curing and drying structure; an internal damper for controlling the circulation of air between the curing and drying chamber and the furnace area; a heat exchange system adapted to be mounted on top of the curing and drying structure and including a pair laterally spaced elongated counter flow heat exchanger modules having opposite end portions, each counter flow heat exchanger module including a series of spaced apart fresh air channels and a series of spaced apart exhaust air channels with the fresh air channels and exhaust air channels being alternately spaced and sandwiched such that streams of fresh air and exhaust air flow adjacent to each other but in counter directions; a fresh air inlet section formed in one end portion of each heat exchanger module for directing outside fresh air into the fresh air channels of the respective modules; an exhaust air inlet section formed in the opposite end portion of the modules for receiving heated exhaust air from the curing and drying structure; a fresh air outlet section formed in the opposite end portions of each heat exchanger modules opposite the exhaust inlet sections; a central fresh air transfer duct extending between the laterally spaced counter flow heat exchanger modules and having an end portion communicatively connected to the fresh air outlet sections of the counter flow heat exchanger modules and another end portion that extends into the curing and drying structure and terminates in the vicinity of the fan such that the fresh air passing from the central transfer duct may be circulated through the curing and drying structure; and conduit means for transferring heated exhaust air from the curing and drying structure into the exhaust inlet section of the respective heat exchanger modules where the exhaust air passing through the heat exchanger modules is effective to heat the incoming fresh air passing through the same prior to the fresh air being introduced into the curing and drying structure.

2. The tobacco curing and drying system of claim 1 wherein the fresh air inlet section and the exhaust air inlet section of each heat exchanger modules are disposed at right angles with respect to each other.

3. The tobacco curing and drying system of claim 2 wherein each heat exchange module is elongated and includes a surrounding wall structure wherein one of the fresh air or exhaust air inlet sections is formed in the side of the surrounding wall structure while the other is formed about one end of the heat exchanger module.

4. A heat exchange system for a tobacco curing and drying structure of the type having a top, a curing a drying chamber, a furnace area, a furnace system including a fan disposed within the furnace area, and damper means for controlling the recirculation of air from the curing and drying section to the furnace area, the heat exchanger system comprising:
  (a) a pair of side-by-side elongated counterflow heat exchanger modules having first and second end portions with each module including a series of spaced apart fresh air channels and a series of spaced apart exhaust air channels with the fresh air channels and exhaust air channels being alternately spaced and sandwiched such that streams of fresh air and exhaust air flow adjacent to each other but in counter directions;
  (b) a fresh air inlet formed in a first end portion of each heat exchanger module for directing outside fresh air into the fresh air channels of the respective modules;
  (c) an exhaust air inlet formed in the second end portion of the modules for receiving heated exhaust air from the curing and drying structure;
  (d) an exhaust transfer duct communicatively connected between the exhaust air inlet of each exchanger module and the curing and drying chamber of the structure for transferring heated exhaust air from the curing and drying chamber into the exhaust air inlets of each heat exchanger module;
  (e) a fresh air outlet formed in the second end portion of each heat exchanger module;
  (f) an exhaust air outlet formed in the first end portion of each heat exchanger module; and
  (g) a main fresh air transfer duct extending from the second end portion of the heat exchanger modules to the furnace area and including an end portion communicatively connected to the fresh air outlet of both of the counter flow heat exchanger modules and another end portion that extends into the curing and drying structure and terminates in the vicinity of the fan such that fresh air passing from the main transfer duct may be circulated through the curing and drying structure, whereby outside fresh air directed through the heat exchange system is heated by exhaust air being exhausted from the curing and drying structure into the two heat exchanger modules.

5. The heat exchange system for a tobacco curing and drying structure of claim 4 wherein the curing and drying structure is elongated with the curing and drying chamber assuming a front part of the structure while the furnace area assumes a rear portion within the structure and wherein the heat exchange modules are situated atop of the curing and drying structure such that the first end portion of the heat exchange modules is disposed about a front portion of the barn while the second end portions of the heat exchange modules are disposed intermediately between the furnace area and the rear of the curing and drying structure.

6. A method of curing and drying tobacco and transferring heat associated with exhaust air to fresh incoming air during the curing and drying process comprising the steps of:
  (a) exhausting air from a tobacco curing and drying structure and splitting the exhaust air into two streams and directing each stream of exhaust air into a first end of a separate heat exchange module;
  (b) moving the exhaust air through separated channels within the heat exchange modules and exhausting the exhaust air from the heat exchange modules about a second end portion thereof that is disposed opposite the first end portion;
  (c) inducing fresh inlet air into the second end portion of each heat exchange module and moving the fresh air through a series of separated channels such that the fresh air and exhaust air are alternately spaced and flow in counter directions with respect to each other through the two heat exchange modules such that heat associated with the exhaust air is continuously being transferred to the counter flowing fresh air;
  (d) directing the fresh air out each heat exchange module about the first end portion thereof and combining the fresh air from each heat exchange module and transferring the combined fresh air to a main fresh air transfer duct; and
  (e) transferring the combined fresh air in the main fresh air transfer duct back to the curing and drying structure where the fresh air is combined with a system of circulating air passing through the curing and drying structure.

7. The method of claim 6 wherein the curing and drying structure includes a curing and drying section and a furnace room and wherein the method includes transferring exhaust air from the curing and drying section into an exhaust air inlet formed in each heat exchange module, and transferring the combined fresh air from the main fresh air transfer duct into the furnace room.

8. The method of curing and drying tobacco of claim 7 wherein the heat transfer occurs on top of the curing and drying structure due to the counter flowing exhaust and fresh air.

9. The method of curing and drying tobacco of claim 6 including the step of controlling the flow of exhaust air being exhausted from the curing and drying structure and the flow of fresh incoming air by a adjusting a damper secured within the main fresh air transfer duct that is communicatively connected to the curing and drying structure.

10. The method of curing and drying tobacco of claim 6 including the steps of directing fresh air into the respective heat exchange module at an angle of approximately 90° with respect to the direction through which the exhaust air is introduced into the heat exchange module.

* * * * *